(12) United States Patent
Matsuoka

(10) Patent No.: US 11,904,689 B2
(45) Date of Patent: Feb. 20, 2024

(54) DISPLAY DEVICE FOR VEHICLE

(71) Applicant: DENSO CORPORATION, Kariya (JP)

(72) Inventor: Kimihiro Matsuoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 388 days.

(21) Appl. No.: 17/391,628

(22) Filed: Aug. 2, 2021

(65) Prior Publication Data

US 2021/0354560 A1 Nov. 18, 2021

Related U.S. Application Data

(63) Continuation of application No. PCT/JP2020/000811, filed on Jan. 14, 2020.

(30) Foreign Application Priority Data

Feb. 5, 2019 (JP) .................................. 2019-018886

(51) Int. Cl.
*B60K 35/00* (2006.01)
*G06F 1/16* (2006.01)

(52) U.S. Cl.
CPC ............ *B60K 35/00* (2013.01); *G06F 1/1656* (2013.01); *B60K 2370/691* (2019.05); *B60K 2370/693* (2019.05); *B60K 2370/98* (2019.05)

(58) Field of Classification Search
None
See application file for complete search history.

(56) References Cited

U.S. PATENT DOCUMENTS

2020/0400995 A1\* 12/2020 Zhou ...................... G02B 6/009
2021/0096424 A1\* 4/2021 Hsu .................... G02F 1/133311
2021/0373381 A1\* 12/2021 Matsuoka ............. G06F 1/1658

FOREIGN PATENT DOCUMENTS

JP 2018022034 A 2/2018
JP 2018045053 A 3/2018

OTHER PUBLICATIONS

"Article 20, Annex 28_Technical Standards for Shock Absorption of Instrument Panels", Ministry of Land, Infrastructure, Transport and Tourism of Japan, Jan. 22, 2015 https://www.mlit.go.jp/jidosha/jidosha_fr7_000007.html.

\* cited by examiner

*Primary Examiner* — Stephen T. Reed
(74) *Attorney, Agent, or Firm* — Harness, Dickey & Pierce, P.L.C.

(57) ABSTRACT

A vehicle display device includes a display unit, a surrounding member, and a cover member. The surrounding member is disposed to surround a periphery of the display unit and has an opening at an end on a viewing side. The cover member is disposed on a display surface of the display unit on the viewing side and covers the opening of the surrounding member. The surrounding member does not cover a surface of the cover member on the viewing side in a direction normal to the surface of the cover member. The surrounding member includes an upper surrounding portion located above the display unit. An upper viewing side end of the upper surrounding portion projects from the surface of the cover member in the direction normal to the surface of the cover member by a length of 0.1 mm or more and 2.0 mm or less relative to the surface of the cover member.

11 Claims, 8 Drawing Sheets

DISPLAY DEVICE FOR VEHICLE

CROSS REFERENCE TO RELATED APPLICATIONS

The present application is a continuation application of International Patent Application No. PCT/JP2020/000811 filed on Jan. 14, 2020, which designated the U.S. and claims the benefit of priority from Japanese Patent Application No. 2019-018886 filed on Feb. 5, 2019. The entire disclosures of all of the above applications are incorporated herein by reference.

TECHNICAL FIELD

The present disclosure relates to a display device to be used in a vehicle as being arranged within a predetermined distance from a seat.

BACKGROUND

For example, there is a vehicle display device which is used in an upright position above an upper surface of an instrument panel. Also, there is a vehicle display device which is used in a state of being embedded in an instrument panel. For such vehicle display devices, various configurations have been proposed for the purpose of improving the visibility of a display screen and improving the design. For example, in a vehicle display device, it has been proposed to have a cover member made of glass for protecting a screen surface.

For example, a vehicle display device may have a touch panel function for the purpose of improving display operability. In such a vehicle display device, a cover member may be made of tempered glass, and a touch panel having a specific thickness may be employed for the purpose of suppressing the risk of the glass cover member being broken due to an impact onto the glass surface. The cover member made of glass will also be referred to as a cover glass.

SUMMARY

The present disclosure describes a display device for a vehicle, having a configuration that suppresses damage to a cover member and has a small bezel width. The vehicle display device includes a display unit, a surrounding member, and a cover member. The surrounding member is disposed to surround a periphery of the display unit and has an opening at an end on a viewing side. The cover member is disposed on a display surface of the display unit on the viewing side and covers the opening of the surrounding member. The surrounding member does not cover a surface of the cover member in a direction normal to a surface of the cover member on the viewing side. The surrounding member includes an upper surrounding portion located above the display unit. An upper viewing side end of the upper surrounding portion projects from the surface of the cover member in the direction normal to the surface of the cover member by a length of 0.1 mm or more and 2.0 mm or less relative to the surface of the cover member.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
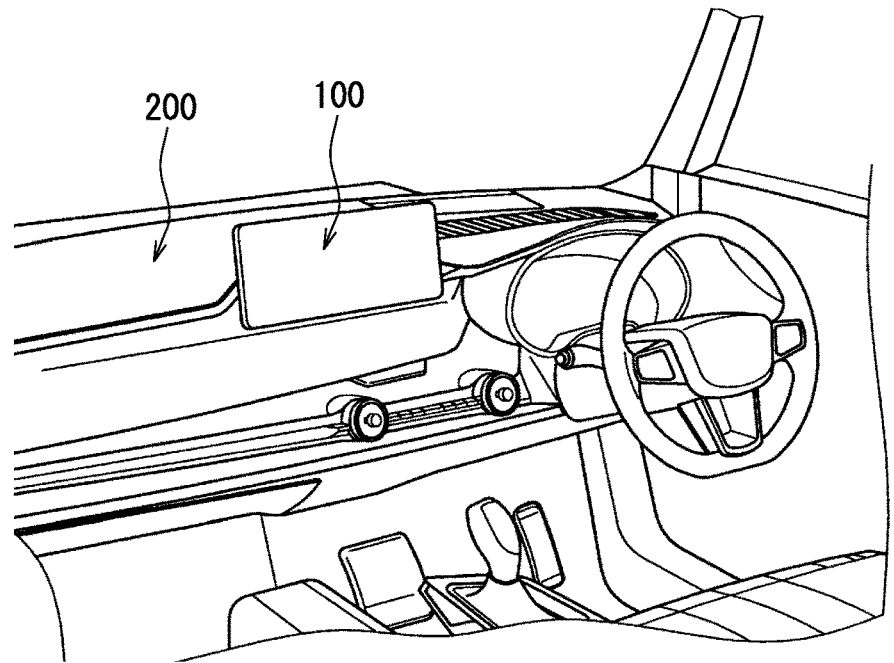
FIG. 1 is a perspective view of a vehicle display device installed in a vehicle, according to an embodiment of the present disclosure.

In a vehicle, a display device may be located in an area in which the occupant's head will collide in an event of a vehicle collision. The area will be referred to as the head collision area. For example, a vehicle display device provided with a touch panel function may be arranged within the reach of the occupant on a driver's seat in order to ensure the operability of the touch panel. Such a vehicle display device will be also located in the head collision area. In such a case, a cover member, such as a cover glass, may be configured so as not to be easily broken for the purpose of protecting occupants.

The head collision area may be determined based on the regulations of the region where the vehicle is used. For example, in Japan, the head collision area can be determined based on a range indicated by "Annex 28, Technical Standards for Shock Absorption of Instrument Panels" in "Article 20 Riding Equipment" of "Safety Standards for Road Transport Vehicles" issued from the Ministry of Land, Infrastructure, Transport and Tourism of Japan.

In a vehicle display device having a touch panel with a specific thickness and a cover member made of tempered glass, the improvement of strength of the cover glass against an impact in a direction substantially orthogonal to the main surface of the cover glass, that is, the improvement of a bending fracture may be expected. Namely, a conventional configuration was provided on the assumption that the head will collide with the surface of the cover glass in the direction orthogonal to the surface of the cover glass, and a head collision with an edge portion of the cover glass from a diagonally upper position was not considered. The edge portion of the cover glass means a terminal portion including a corner portion of the cover glass.

In general, the occupant's head is located at a position higher than the vehicle display device. Therefore, a position where an occupant head will collide with the vehicle display device, that is, an attack point could not be on the surface of the cover glass, but be at an upper end on a viewing side of the vehicle display device. The impact of a head collision with the upper end of the vehicle display device on the viewing side directly or indirectly acts on an upper edge of the cover glass. Since the impact onto the edge portion of the cover glass is concentrated in a small area, there is a higher risk of glass breakage than when the attack point is located on the surface of the cover glass. Further, since the impact onto the edge portion has a small impact area, the cover glass may be cracked or broken by a mechanism of Hertz fracture rather than bending fracture. For this reason, the display device for a vehicle is preferably configured so that the cover glass is not easily broken even when an occupant head collides with the upper end portion of the device on the viewing side from a diagonally upper position.

In general, in a display device, a frame is arranged on the outer periphery of the cover glass. The frame is also referred to as the bezel. If the width of the bezel is relatively large, it is possible to reduce the possibility that the impact onto the upper end portion of the vehicle display device directly or indirectly acts on the upper edge portion of the cover glass. However, the smaller the bezel width is, the more the appearance of the display device improves. Therefore, in recent years, there has been a demand for a vehicle display device having a reduced bezel width. A cover member made of acrylic or polycarbonate will also have a property of being easily cracked by an impact onto the edge portion. That is, even if the cover member is made of acrylic or polycarbonate, it will have the same problem as the cover glass against the edge impact.

The present disclosure provides a display device for a vehicle, which suppresses breakage of a cover member while reducing the width of a bezel.

According to an aspect of the present disclosure, a display device for a vehicle includes a display unit for displaying information, a surrounding member, and a cover member. The surrounding member has a tubular shape surrounding a periphery of the display unit and having an opening at an end on a viewing side. The cover member has a plate shape and is disposed to cover the opening of the surrounding member on the viewing side of a display surface of the display unit. A viewing side end of the surrounding member does not cover a surface of the cover member on the viewing side. The surrounding member has an upper portion located above the display unit, and an upper viewing side end of the upper portion projects on the viewing side from the surface of the cover member by an amount of 0.1 mm or more and 2.0 mm or less.

In such a configuration, a front end of a part of the surrounding member, that is, the upper viewing side end of the upper portion of the surrounding member is configured to project by a small amount on the viewing side from the surface of the cover member. Therefore, the upper viewing side end can be a primary position of collision with an occupant head, and hence it is less likely that an impact of the collision between the display device and the occupant head will directly act on the edge portion of the cover member. Since the upper viewing side end projects from the surface of the cover member on the viewing side, the upper viewing side end is likely to displace downwardly due to the impact of the head collision. In other words, the upper viewing side end continues to stay between the occupant head and the edge portion of the cover member. As a result, it is possible to suppress the impact of collision from acting on the edge portion of the cover member. Accordingly, a possibility of breakage of the cover member due to the collision of the occupant head with the display device will be reduced.

In the configuration described above, the viewing side end of the surrounding member corresponds to the bezel. The effects described above can be achieved by the upper viewing side end projecting on the viewing side. Therefore, it is not necessary to increase the width of the viewing side end of the surrounding member, that is, the width of the bezel.

Figure 2:
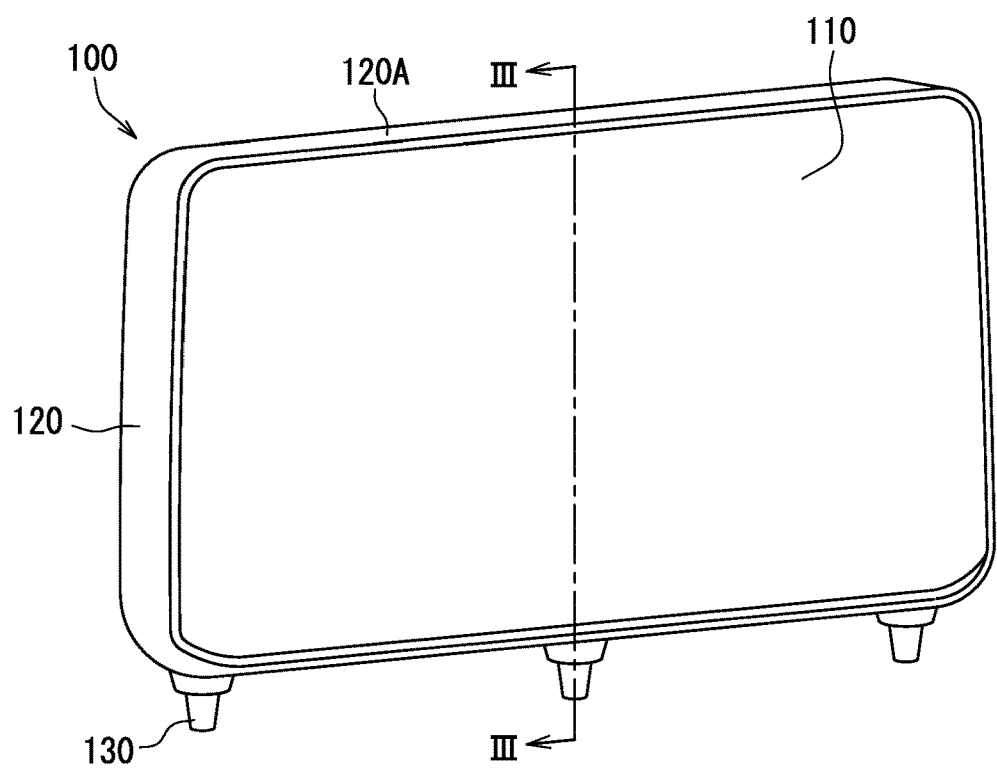
FIG. 2 is an external perspective view of the vehicle display device for showing an overall image.

Hereinafter, embodiments of the present disclosure will be described with reference to the drawings. FIGS. 1 and 2 are diagrams for showing an example of a schematic configuration of a vehicle display device 100 according to the present disclosure. The vehicle display device 100 is installed on the instrument panel 200 of a vehicle and is configured as a device for displaying various information. More specifically, the vehicle display device 100 is arranged in a center area on the upper surface of the instrument panel 200 in a vehicle width direction in an orientation in which the display surface of a display unit 1 faces the rear of the vehicle. In regard to the vehicle display device 100, the side on which information is displayed is referred to as a viewing side. The viewing side corresponds to the front side of the vehicle display device 100. In FIG. 1, the driver's seat is exemplarily shown on the right side of the vehicle. The vehicle display device 100 may be used in a vehicle having a driver's seat on the right side, a vehicle having a driver's seat on the left side, or the like. Further, the vehicle display device 100 may be used in a fully autonomous vehicle that does not have a driver's seat.

The vehicle display device 100 has a device vertical direction and a device horizontal direction. The device vertical direction corresponds to an up and down direction in FIG. 2, and the device horizontal direction corresponds to a left and right direction in FIG. 2. The vehicle display device 100 may be attached to the vehicle so that the device vertical direction is substantially parallel to a vertical direction of the vehicle. Further, the vehicle display device 100 may be attached to the vehicle so that the device horizontal direction is substantially parallel to a left and right direction of the vehicle, that is, a vehicle width direction. The substantially parallel state is not limited to an exactly parallel state, but includes a state being tilted by about 30° relative to the exactly parallel state. That is, the vehicle display device 100 may be attached to the instrument panel 200 in a tilted position relative to a horizontal plane of the vehicle so that an occupant seated in the driver's seat can recognize the display screen of the display unit 1 without discomfort. The vehicle horizontal plane corresponds to a plane perpendicular to the vehicle height direction.

The vehicle display device 100 includes a display surface 110 on which an image is displayed, a device side surface 120, and a device back surface. The display surface 110 can be regarded as a display screen. The device back surface is opposite to the display surface 110. The device side surface 120 is a surface extending in a viewing direction of the vehicle display device 100. The device side surface 120 includes a left side surface, a right side surface, an upper surface 120A, and a lower surface, corresponding to the device vertical direction and the device horizontal direction of the vehicle display device 100. The vehicle display device 100 has a flat rectangular parallelepiped shape defining a thickness direction orthogonal to the display surface 110. Thus, a direction orthogonal to the display surface 110 will be referred to as a device thickness direction. In the vehicle display device 100, a width in the device horizontal direction is greater than a height in the device vertical direction. For example, the viewing direction of the vehicle display device 100 can be understood as a direction normal to the display surface 110.

The vehicle display device 100 has coupling parts 130, for example, used for fixing to the instrument panel 200, on the lower wall portion. For example, the vehicle display device 100 is fixed to the instrument panel 200 by inserting the coupling parts 130 into insertion holes (not shown) provided in the instrument panel 200. Alternatively, the vehicle display device 100 may be fixed to the vehicle by various other methods, such as using screwing. The coupling parts 130 are arbitrary elements.

The upper surface 120A is provided by a portion of the surrounding member 5 described later, the portion being located above the display unit 1. Of the surrounding member 5, the portion located above the display unit 1 and defining the upper surface 120A corresponds to the upper surrounding portion. Further, an end of the upper surrounding portion on the device front side corresponds to an upper viewing side end. Hereinafter, among the configurations of the vehicle display device 100, the configuration proximity to the upper surface 120A will be mainly described. In the following descriptions, for example, "viewing side end of the surrounding member 5" refers to the viewing side end of the portion of the surrounding member 5 located above the display unit 1, the portion defining the upper surface 120A. Of course, the following description can be applied to parts other than the upper surface portion 120A. Note that a side surface or a side wall portion of a member means the surface or the wall of the member that faces a direction substantially orthogonal to the viewing direction. Further, a viewing side end of a member means a front-most end portion (that is, the front end portion) of the member.

Figure 3:
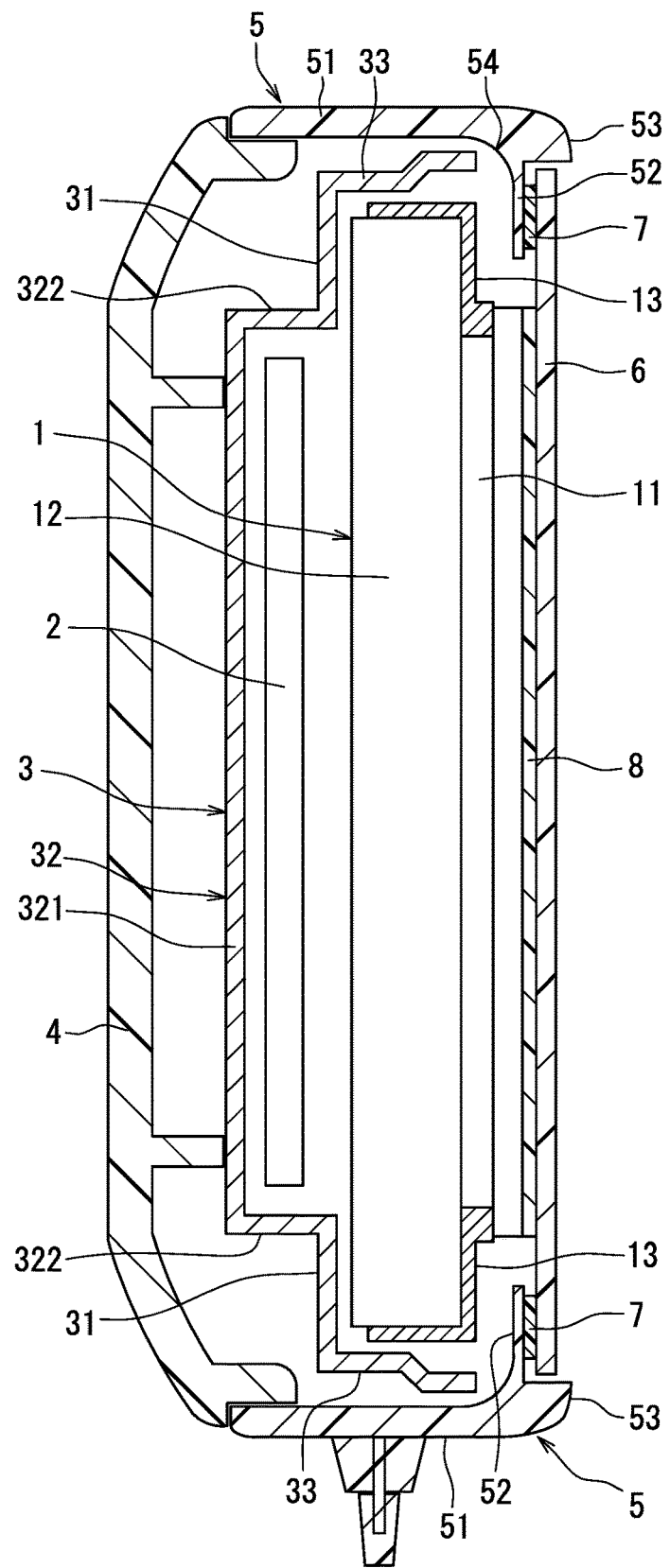
FIG. 3 is a cross-sectional view of the vehicle display device for showing an internal configuration.

As shown in FIG. 3, the vehicle display device 100 is implemented by combining the display unit 1, a circuit board 2, an inner case 3, a back case 4, the surrounding member 5, and a cover member 6. The combination of the back case 4 and the surrounding member 5 forms a housing for the display unit 1. On the back case 4, the inner case 3, the circuit board 2, and the display unit 1 are arranged on top of the other in this order. Note that, in FIG. 3, some members that should be actually in contact with each other are shown separated from each other in order to clarify the boundary of those members.

The display unit 1 is a device that drives based on a control signal from a display controller mounted on the circuit board 2 to display an image. The display unit 1 corresponds to a display part. The display unit 1 has, for example, a rectangular display surface, i.e., a rectangular screen. The display unit 1 is configured to enable full-color display. As the display unit 1, various displays such as a liquid crystal display, an organic electro luminescence (EL) display, and a plasma display can be adopted. In the present embodiment, for example, the display unit 1 includes a liquid crystal panel 11 using a thin film transistor (TFT) and a backlight 12. The liquid crystal panel 11 is, for example, an active matrix type liquid crystal panel formed of a plurality of liquid crystal pixels arranged in two-dimensional directions.

The backlight 12 is a light source panel that emits light towards the liquid crystal panel 11. The backlight 12 is implemented by using one or more LEDs. The backlight 12 is arranged on the back side of the liquid crystal panel 11. The liquid crystal panel 11 is fixed to the backlight 12 via a light source frame 13 attached to the rim of the backlight 12. The light source frame 13 and the liquid crystal panel 11 may be adhered to each other with an elastic adhesive, an elastic double-sided tape, or the like. The elastic double-sided tape refers to a double-sided tape having elasticity (in other words, cushioning property and elasticity) in which an adhesive is applied to both sides of a non-woven fabric, sponge, or the like. The elastic double-sided tape is, for example, a double-sided tape using acrylic foam.

The light source frame 13 may be formed of a metal material such as aluminum, magnesium, stainless steel, or a steel plate, or may be made by using a resin material such as polycarbonate (PC). As an example, the backlight 12 is configured by the direct type method. As another example, the backlight 12 may be configured by the edge light method.

The circuit board 2 is a board on which the electric circuit of the vehicle display device 100 is formed. The circuit board 2 has a flat plate shape. The circuit board 2 is made of a synthetic resin such as glass epoxy. A display controller, a power supply circuit, and the like are mounted on the circuit board 2. The circuit board 2 is arranged on the back side of the display unit 1 in a position facing the display unit 1. Specifically, the circuit board 2 is fixed to the inner case 3 so as to be interposed between the inner case 3 and the display unit 1, specifically, the backlight 12. As another example, the circuit board 2 may be arranged on the back side of the inner case 3. In such a case, for example, the circuit board 2 may be arranged between the inner case 3 and the back case 4.

The inner case 3 is a member that covers and integrally supports the display unit 1 and the circuit board 2 on the back side. The inner case 3 has a light shielding property. The inner case 3 is made of, for example, a synthetic resin such as polycarbonate. The inner case 3 may be made of a metal material such as aluminum, magnesium, stainless steel, or a steel plate. The inner case 3 may be configured by combining a plurality of parts. The inner case 3 has a bottomed rectangular dish-like shape in which the edge portion expands outwardly and stepwise. Specifically, the inner case 3 has a display receiving portion 31 for supporting the display unit 1 from the back side, a recessed portion 32 recessed from the display receiving portion 31 to the back side, and an inner frame 33 covering a side surface portion of the display unit 1.

The display receiving portion 31 is substantially flat so as to be into contact with the end portion of the back surface of the display unit 1. The contact here is not limited to an actually contact state, but also includes a state where a separation distance between the display receiving portion 31 and the back surface of the display unit 1 is 0.1 mm or less, that is, the state of being extremely close to each other. The display receiving portion 31 has substantially the same size as the back surface of the display unit 1. Specifically, the display receiving portion 31 is slightly larger (for example, about several millimeters larger) than the display unit 1 so that the inner frame 33 extending from the edge of the display receiving portion 31 can accommodate the display unit 1 therein. The display receiving portion 31 is provided with an opening, as a viewing side end portion of the recessed portion 32, at a portion separated from the edge of the display receiving portion 31 by a certain distance. The recessed portion 32 can be regarded as a projected portion in another viewpoint. That is, the display receiving portion 31 is configured as a rectangular plate-shaped member having an opening.

The recessed portion 32 includes a bottom plate portion 321 and a recess wall portion 322. The bottom plate portion 321 has substantially the same size as the opening portion of the display receiving portion 31. The recess wall portion 322 connects the edge of the bottom plate portion 321 and the opening portion of the display receiving portion 31. The bottom plate portion 321 is formed so as to face the back surface of the display unit 1 at a predetermined interval. The recess wall portion 322 extends from the opening portion of the display receiving portion 31 toward the back side. The circuit board 2 described above is fixed to the bottom plate portion 321. If the bottom plate portion 321 is regarded as a first bottom portion which is the bottom portion on the back-most side in the inner case 3, the display receiving portion 31 corresponds to a second bottom portion formed on the outside and the visual side of the first bottom portion. The recess wall portion 322 corresponds to a portion connecting the first bottom portion and the second bottom portion.

The inner frame 33 extends from the edge of the display receiving portion 31 toward the viewing side. The inner frame 33 is disposed along the side surface portion of the display unit 1. The inner frame 33 corresponds to the inner frame portion. The viewing side end of the inner frame 33 (hereinafter, the inner frame end portion 331) is separated from the side surface of the display unit 1 by 1.0 mm or more, and is disposed to be proximate to the inner surface of the surrounding member 5 described later (particularly, the bezel back side portion 54). For example, the state that the viewing side end of the inner frame 33 is proximate to the inner surface of the surrounding member 5 means that a distance between the viewing side end of the inner frame 33 and the inner surface of the surrounding member 5 is, for example, equal to or less than 2.0 mm. The inner frame end portion 331 corresponds to the viewing side end of the inner frame portion.

Figure 4:
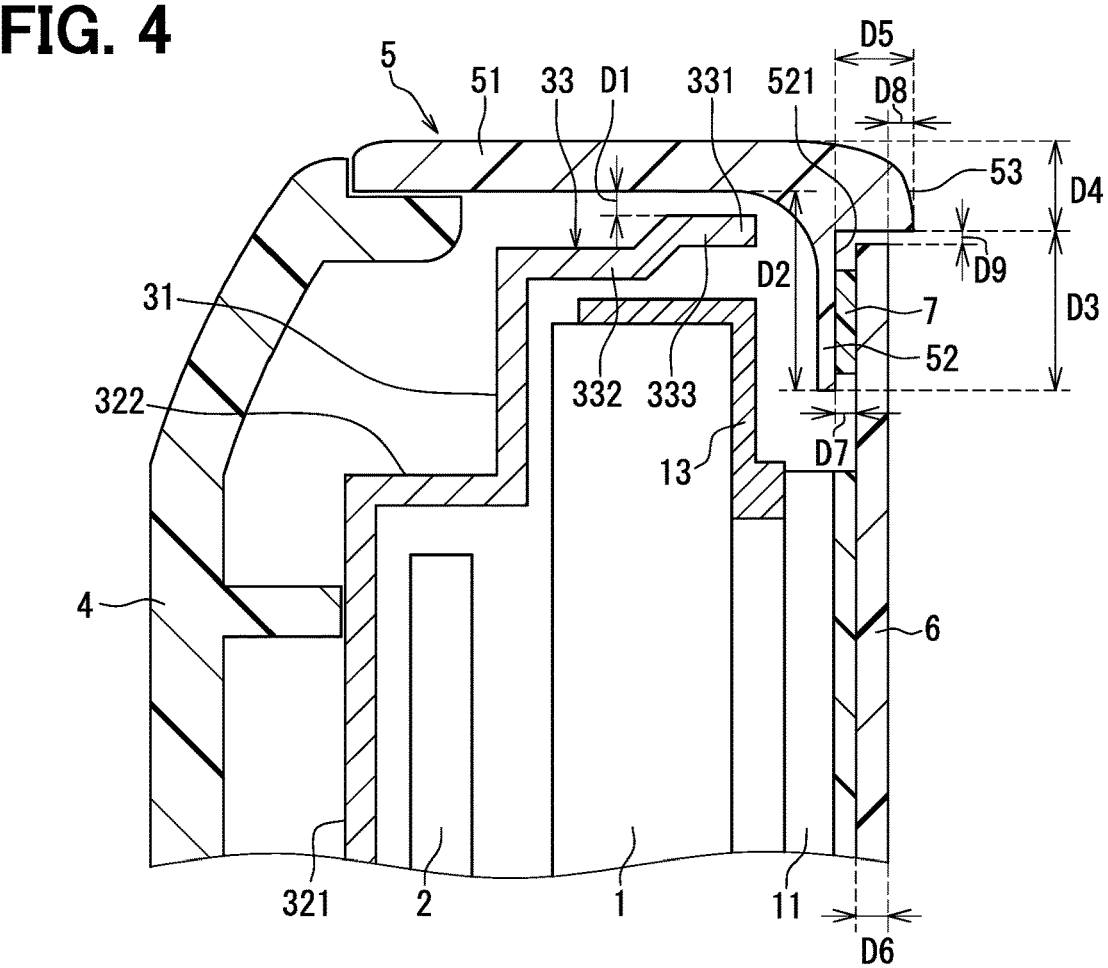
FIG. 4 is an enlarged cross-sectional view of an upper part of the vehicle display device for showing an internal configuration of the upper part.

More specifically, as shown in FIG. 4, the inner frame 33 has a side support portion 332 and a separation portion 333. The side support portion 332 is configured to be in contact with the side surface portion of the display unit 1. The separation portion 333 is configured so that a separation distance from the side surface portion of the display unit 1 is greater than that of the side support portion 332. The side support portion 332 corresponds to a configuration for protecting the side surface portion of the display unit 1 and restricting the movement of the display unit 1 in the device vertical direction and the device horizontal direction. The size of the separation portion 333 is adjusted so that a distance D1 from the inner peripheral surface of the surrounding member 5 is about 1 mm. The inner frame end portion 331 described above corresponds to the viewing side end of the separation portion 333. The separation portion 333 including the inner frame end portion 331 plays a role of suppressing deformation of the surrounding member 5 on the inner side of the surrounding member 5. Specifically, the separation portion 333 suppresses the cover receiving portion 52 of the surrounding member 5 from being deformed downward. It should be noted that such a configuration of the inner frame 33 corresponds to a configuration in which the inner frame 33 expands stepwise from the back side toward the viewing side.

The inner case 3 described above is fixed to the back case 4 by, for example, a snap-fit mechanism. The method for maintaining the combined state of these members (hereinafter, the fixing method) is not limited to the method described above. The inner case 3 and the back case 4 may be connected to each other by screwing or welding.

The back case 4 is configured to support the inner case 3 on the back side. The back case 4 has a light-shielding property. The back case 4 is made of a synthetic resin such as polycarbonate. The back case 4 is formed in a size necessary and sufficient for accommodating the inner case 3. The back case 4 is formed in the shape of a bottomed rectangular dish-like shape. That is, the back case 4 has a shape in which the rim portion is gradually curved toward the viewing side with respect to the bottom portion.

The back case 4 is formed with a fitting groove, on its outer peripheral portion, for fitting with a fitting nail provided on the back side of the surrounding member 5. The fitting nail and the fitting groove are not shown. The fitting groove may be provided at a position corresponding to the fitting nail. The number and formation location of the fitting groove and fitting nail may be appropriately designed. The fitting groove may be formed over the entire perimeter of the back case 4. From the viewpoint of improving waterproofness, an O-ring or the like may be arranged at the connecting portion between the back case 4 and the surrounding member 5. That is, various waterproof and dustproof structures can be applied to the connecting portion between the back case 4 and the surrounding member 5. The back case 4 and the surrounding member 5 may be fixed to each other by screwing or welding, or with an elastic adhesive.

The surrounding member 5 is a tubular member that entirely surrounds the inner case 3 including the display unit 1 from the side. Here, surrounding from the side means surrounding the display unit 1 on the outer periphery with respect to a direction orthogonal to the thickness direction of the display unit 1. The viewing side end and the back side end of the surrounding member 5 define openings. The tubular shape of the surrounding member 5 is not limited to a cylindrical shape having a circular or elliptical cross section, but may be a square tubular shape having a rectangular cross section. The surrounding member 5 has a light-shielding property. The surrounding member 5 is, for example, made of a resin material such as PC resin.

The surrounding member 5 integrally includes a peripheral wall portion 51, a cover receiving portion 52, and a bezel portion 53. The configurations such as the peripheral wall portion 51, the cover receiving portion 52, and the bezel portion 53 all refer to a part of the surrounding member 5. The configurations such as the peripheral wall portion 51, the cover receiving portion 52, and the bezel portion 53 are physically (in other words, as an entity) integrally and continuously connected to each other.

The peripheral wall portion 51 fitted with the back case 4 functions as a portion that surrounds the display unit 1, the circuit board 2, and the inner case 3 from the outer peripheral side. The peripheral wall portion 51 corresponds to a main body portion of the surrounding member 5. The back side end of the peripheral wall portion 51 is formed with the fitting nail for fitting with the fitting groove provided on the outer peripheral portion of the back case 4. The cover receiving portion 52 is formed at the viewing side end of the peripheral wall portion 51 so as to project inward, that is, toward the inside of the surrounding member 5. From another point of view, the peripheral wall portion 51 corresponds to a tubular part extending from the cover receiving portion 52 toward the viewing side.

The cover receiving portion 52 is configured to support the edge portion of the cover member 6 from the back side.

The cover receiving portion 52 has a continuous shape so as to substantially go around the inside of the peripheral wall portion 51. The viewing side surface of the cover receiving portion 52 is flat so as to be parallel to the display surface of the display unit 1. The projection amount D2 of the cover receiving portion 52 with respect to the peripheral wall portion 51 is, for example, 10 mm. The projection amount D2 of the cover receiving portion 52 with respect to the peripheral wall portion 51 may be another value, such as 8 mm or 12 mm. The width D3 of the portion of the cover receiving portion 52 on which the cover member 6 is mounted (hereinafter referred to as the mounting surface 521) is, for example, 7 mm. The width D3 of the mounting surface 521 may be 5 mm or the like.

The surface of the cover receiving portion 52 on the back side of the mounting surface 521 has a curved shape having a predetermined radius of curvature so as to be continuously connected to the inner side surface of the peripheral wall portion 51. That is, the cover receiving portion 52 projects inward from the inner surface portion of the peripheral wall portion 51 in a semi-arch shape. The radius of curvature is set so as to allow the bezel portion 53 to displace downward, that is, in an extending direction of the cover member 6 due to an impact acting on the bezel portion 53 from a diagonally upper position on the viewing side. The radius of curvature of the surface of the cover receiving portion 52 may be, for example, 5 mm, 10 mm, or 20 mm.

On the inner surface of the surrounding member 5, the boundary portion (that is, the semi-arched portion) between the peripheral wall portion 51 and the cover receiving portion 52 corresponds to the portion located on the back side of the bezel portion 53. Therefore, this portion is referred to as the bezel back side portion 54. The bezel back side portion 54 corresponds to the back side portion of the cover receiving portion 52. In the present embodiment, the cover receiving portion 52 preferably projects from the inner surface portion of the peripheral wall portion 51 toward the inside in a semi-arched shape. However, the shape of the cover receiving portion 52 is not limited to the shape described above. The cover receiving portion 52 may be formed so as to extend perpendicularly and inwardly from the inner surface portion of the peripheral wall portion 51.

The bezel portion 53 is a portion of the surrounding member 5 located on the viewing side of the cover receiving portion 52. The bezel portion 53 is extended on the edge portion of the cover receiving portion 52 so as to surround the edge of the cover member 6. The bezel portion 53 is extended substantially perpendicular to the mounting surface 521 so as not to cover the surface of the cover member 6 on the viewing side. That is, the surrounding member 5 is configured so as not to cover the viewing side surface of the cover member 6. The thickness D4 of the bezel portion 53 is, for example, 2.5 mm. The outer edge of the bezel portion 53 is beveled. For example, the bezel portion 53 is formed so that the thickness D4 gradually decreases from the innermost portion toward the tip portion. The thickness D4 of the bezel portion 53 corresponds to the width or thickness of the surrounding member 5 that can be seen around the cover member 6. Further, the thickness D4 of the bezel portion 53 corresponds to the width of the viewing side end portion of the upper part of the bezel portion 53 in the device vertical direction. The thickness D4 of the bezel portion 53 may be 10 mm or less. Further, the thickness D4 of the bezel portion 53 may be 5.0 mm or less at the maximum from the viewpoint of design. Furthermore, the thickness D4 of the bezel portion 53 may be 3.0 mm or less from the viewpoint of design.

The height D5 of the bezel portion 53 with respect to the mounting surface 521, that is, the length in the viewing direction from the mounting surface 521 is a value obtained by the sum of the thickness D6 of the cover member 6, the thickness D7 of the elastic adhesive member 7 and a likelihood of 0.5 mm. In the present embodiment, the height D5 of the bezel portion 53 with respect to the mounting surface 521 is 2.4 mm. That is, the tip portion of the bezel portion 53 projects by 0.5 mm from the viewing side surface of the cover member 6. Since the projection amount D8 of the bezel portion 53 with respect to the cover member 6 is very small, the bezel portion 53 does not function as a back plate, that is, a hood. Further, since the projection amount of the bezel portion 53 with respect to the cover member 6 is very small, the bezel portion 53 hardly give an impression that the bezel portion 53 protrudes with respect to the cover member 6. That is, it is possible to provide an external appearance in which the bezel portion 53 and the cover member 6 are connected substantially seamlessly. The bezel portion 53 may be configured such that the projection amount D8 of the bezel portion 53 with respect to the cover member 6 is 0.1 mm or more and 2.0 mm or less. The bezel portion 53 may be configured to protrude from the viewing side surface of the cover member 6, and the projection amount D8 may be 0.3 mm or more. Further, from the viewpoint of design, the bezel portion 53 may be configured such that the projection amount D8 of the bezel portion 53 with respect to the cover member 6 is 1.0 mm or less.

The cover member 6 is a member to protect the display surface of the display unit 1. The cover member 6 is a transparent plate-shaped member. The cover member 6 is made of glass. The glass includes tempered glass. The cover member 6 is made of glass from the viewpoint of transparency. Alternatively, the cover member 6 may be made of resin such as acrylic or polycarbonate. The thickness D6 of the cover member 6 is about 1.5 mm. The thickness D6 of the cover member 6 can be changed as appropriate. The thickness D6 of the cover member 6 may be 0.25 mm, 0.5 mm, 1.0 mm, 2.0 mm, or the like.

The cover member 6 has substantially the same size as the inner dimension of the bezel portion 53 of the surrounding member 5. Specifically, the cover member 6 is formed to have a size so as to generate a gap of about 0.5 mm from the bezel portion 53 in a state of being attached to the surrounding member 5. Namely, the cover member 6 is slightly smaller than the inner size of the bezel portion 53. According to the configuration in which the separation distance D9 between the bezel portion 53 and the cover member 6 is about 0.5 mm as described above, it is less likely that the bezel portion 53 and the cover member 6 will come into contact with each other due to the difference in the linear expansion coefficients. Thus, a stress applied to the cover member 6 due to the bezel portion 53 can be suppressed. Further, it is less likely that the bezel portion 53 and the cover member 6 will come into contact with each other due to the impact applied to the upper end portion of the vehicle display device 100. Also, the stress applied to the cover member 6 from the bezel portion 53 can be suppressed. The separation distance D9 between the bezel portion 53 and the cover member 6 may be 0.1 mm or more and 2.0 mm or less. The manufacturing target value (design value) of the separation distance D9 between the bezel portion 53 and the cover member 6 may be 0.2 mm, 0.8 mm, 1.0 mm, 1.5 mm, or the like.

The cover member 6 is adhered to the mounting surface 521 of the surrounding member 5 with a predetermined elastic adhesive member 7. The cover member 6 covers the opening on the visual side end of the surrounding member 5. The elastic adhesive member 7 is provided by an elastic adhesive or an elastic double-sided tape. The thickness D7 of the elastic adhesive member 7 is set to 0.4 mm. Since the cover member 6 is fixed to the surrounding member 5 with the elastic adhesive member 7, it is possible to suppress the displacement of the mounting surface 521 due to the impact applied to the upper end portion of the vehicle display device 100 from acting on the cover member 6 as a bending stress. Further, the elastic adhesive member 7 can absorb the stress, that is, a thermal stress caused by the difference in the linear expansion coefficient between the cover member 6 and the surrounding member 5. Therefore, it is possible to suppress the cover member 6 from cracking due to the thermal deformation of the surrounding member 5. The coefficient of linear expansion refers to the rate at which the length of the object changes in response to an increase in temperature.

Further, the cover member 6 is adhered to the screen surface of the display unit 1 with a predetermined resin material having transparency, which will be hereinafter referred to as an optical bonding material). That is, the cover member 6 is optical-bonded with the display unit 1. For convenience, the resin layer that fills the gap between the cover member 6 and the display unit 1 is referred to as an optical adhesive layer 8. As the optical bonding material, any resin that is colorless and transparent and has elasticity may be used, and various resin materials can be adopted. As the optical bonding material, an acrylic-based, silicon-based, or urethane-based resin, which is so-called an optical clear resin (OCR), is suitable. The optical adhesive layer 8 may be made by using a sheet-shaped optical clear adhesive (OCA). In the configuration in which the optical adhesive layer 8 is provided between the display unit 1 and the cover member 6, it is possible to suppress the reflection of light and to improve the visibility. The cover member 6 and the optical adhesive layer 8 visibly transmit the display content produced by the display unit 1 to the occupants, due to their transparency. The optical adhesive layer 8 is an arbitrary element and can be omitted.

<Effects of Present Embodiment>

Figure 5:
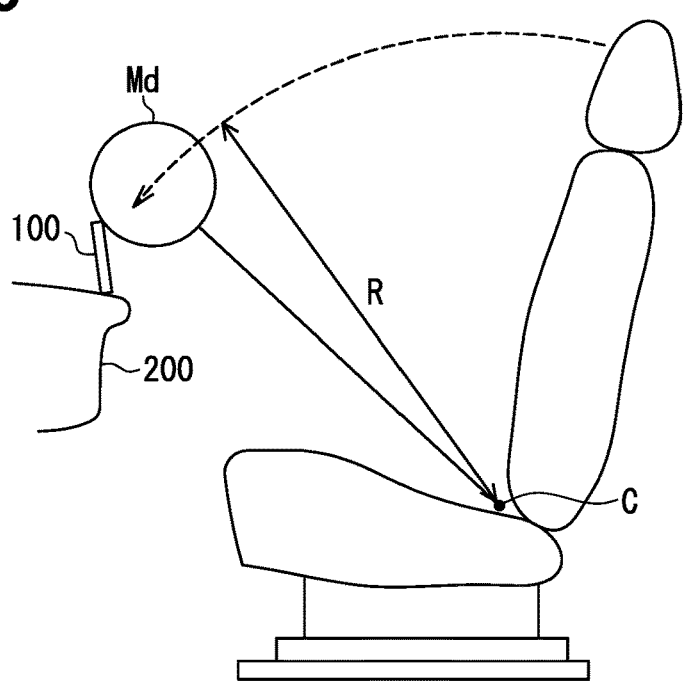
FIG. 5 is a diagram for explaining a mode of head collision with a vehicle display device.

The vehicle display device 100 could be located at a position lower than the occupant's head and be situated in an area in which the occupant's head can collide due to an impact in an event of a frontal collision of the vehicle. Hereinafter, the area will be referred to as the head collision area. In a case where the vehicle display device 100 is attached to the head collision area, the occupant's head may collide with the upper end portion of the vehicle display device 100 from a diagonally upper position due to the impact of the vehicle collision. FIG. 5 shows a configuration for testing a position where a spherical head model Md having a diameter of 165 mm, which imitates the head of an occupant, collides with the vehicle display device 100 mounted on the instrument panel 200, and the position of the collision of the head model Md.

In this case, the head collision area is, for example, an area in which the spherical head model Md statically contacts when the spherical head model Md is rotated about a predetermined rotation center C with a predetermined radius of gyration R. The radius of gyration R may be set to a value corresponding to the length of a human body from the hip joint point to the center of the head. The radius of gyration R is, for example, 705 mm. The radius of gyration R may be adjusted in the range of 654.5 mm to 755.5 mm.

The center of rotation C can be, for example, a seating reference point. The seating reference point refers to the position of the hip joint point when a human body model is seated in a seat, such as a driver's seat, by the seating method specified in ISO 6549-1980, or the design standard position set on the seat corresponding thereto. Further, in case of the seat that can be adjusted back and forth, the center of rotation C can employ a point that is moved forward by a predetermined amount (for example, 127 mm) and vertically upward by a predetermined amount (for example, 19 mm) from the seating reference point, in addition to the seating reference point.

In the above test configuration, the direction in which the impact from the head acts on the collision position is the direction perpendicular to the tangent line at the collision position, that is, the normal direction at the collision position. Further, the collision test of the head model may be performed on the assumption that a vehicle traveling at a speed of 20 km/h has a frontal end collision. For example, the collision speed of the head model may be set to 20±1 km/h.

Figure 6:
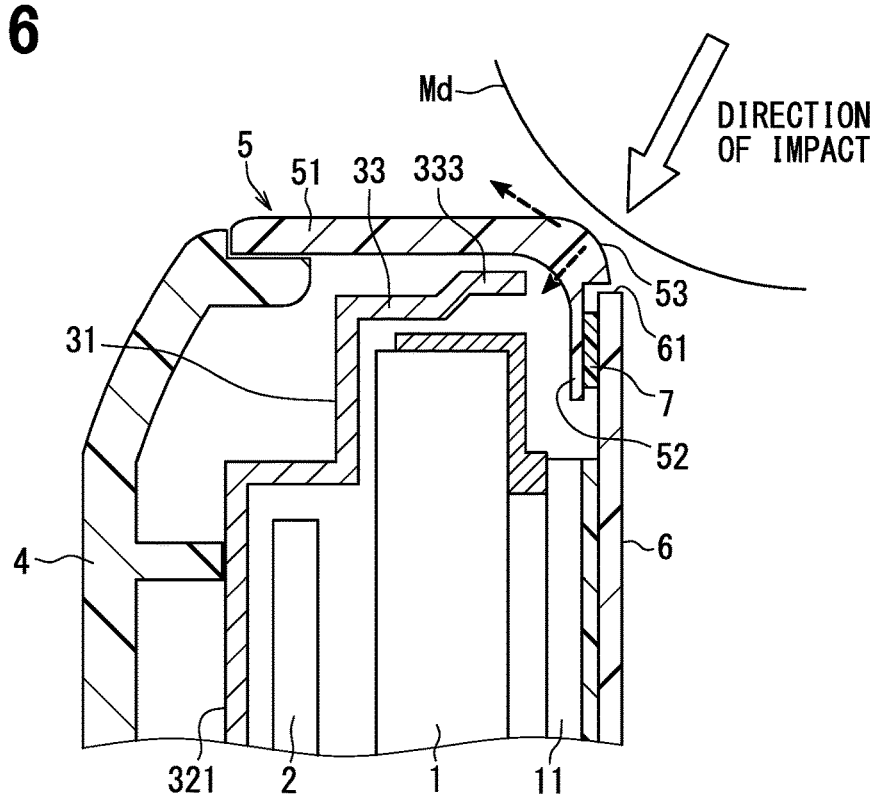
FIG. 6 is a diagram for explaining an impact of a head collision in a comparative configuration.

FIG. 6 shows a comparative configuration in which a vehicle display device is configured such that a bezel portion 53 is located behind the surface of a cover member 6. In this case, the bezel portion 53 could be displaced upward or backward of the vehicle display device due to the impact of a head collision, and thus the head could be directly collide with the edge 61 of the cover member 6. Therefore, the cover member 6 is relatively liable to crack. The edge portion 61 is also referred to as a terminal portion. The edge portion 61 includes a corner portion. In FIG. 6, a blank solid line arrow indicates the direction of action of the impact, that is, the direction of the impact, and a broken line arrow indicates the displacement direction of the bezel portion 53. The above-described head collision test was carried out for the vehicle display device of the comparative configuration in which the bezel portion 53 of the cover member 6 is located on the back side of the surface of the cover member 6. As a result, it was confirmed that the cover member 6 was relatively fragile due to the above-described action.

Figure 7:
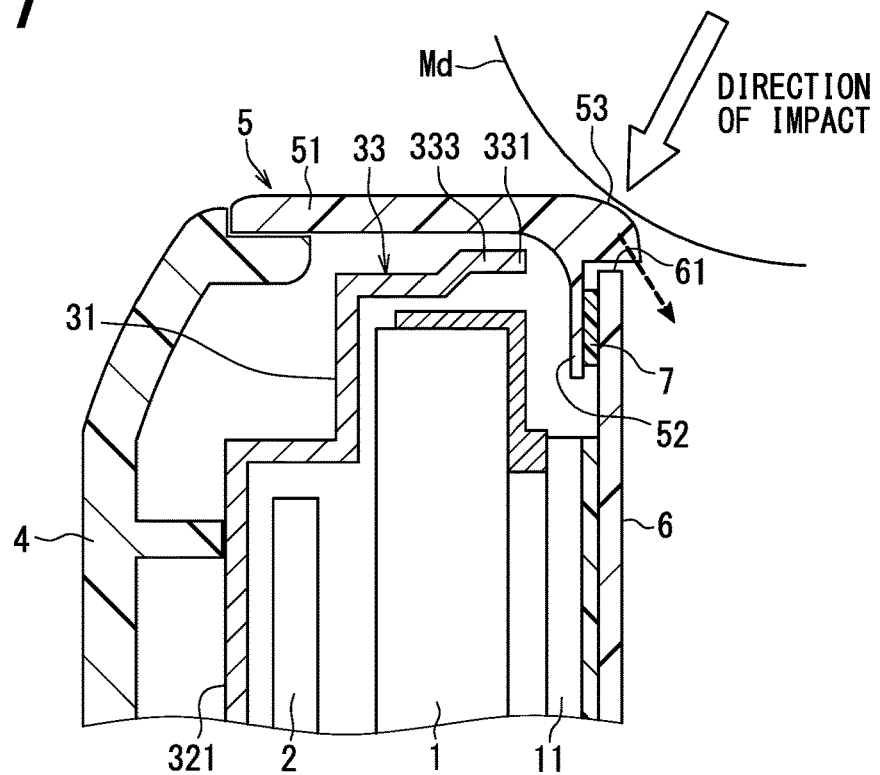
FIG. 7 is a diagram for explaining effects achieved by the embodiment.

On the other hand, in the configuration of the present embodiment, the front end portion, that is, the bezel portion 53 of the surrounding member 5 is configured to project by a small amount toward the viewing side from the surface of the cover member 6. In this case, therefore, a primary collision position with the occupant's head is in the bezel portion 53 defining the upper surface portion 120A. In other words, it is less likely that the impact due to the collision between the vehicle display device 100 and the head will be directly applied to the edge portion of the cover member 6. Further, since the bezel portion 53 projects to the viewing side from the surface of the cover member 6, the bezel portion 53 is not displaced upward or backward of the vehicle display device 100 due to the impact, but is likely to displace downward as shown in FIG. 7. The bezel portion 53 continues to stay between the head portion and the edge portion 61 of the cover member 6, and thus the possibility that the impact of collision acts on the edge portion 61 of the cover member 6 can be reduced. The broken line arrow in FIG. 7 indicates the displacement direction of the bezel portion 53.

In addition, the downward displacement of the bezel portion 53 is regulated by the inner frame end portion 331. That is, even if the bezel portion 53 is displaced downward due to a head collision, the inner side surface of the peripheral wall portion 51 and the inner frame end portion 331 come into contact with each other. Thus, it is less likely that the bezel portion 53 will be largely displaced downwardly. As a result, it is possible to reduce the possibility that the cover member 6 will be deformed and cracked due to the displacement of the bezel portion 53. That is, according to the configuration of the present embodiment, even when the bezel portion 53 receives an impact from a diagonally upward position on the viewing side, the possibility that the cover member 6 is cracked by the impact can be reduced.

In the present embodiment, further, the thickness D4 of the bezel portion 53 is set to 2.5 mm, and the outer edge portion of the bezel portion 53 is beveled. According to such a configuration, both design and panel rigidity can be achieved. The above-described head collision test was carried out for the configuration of the present embodiment. In the present embodiment, it was confirmed that the probability of crack of the cover member 6 can be suppressed within a predetermined allowable range when the thickness D4 of the bezel portion 53 was set to 2.0 mm and the protrusion amount D8 was set to 0.5 mm. That is, according to the configuration of the present embodiment, the cracking of the cover member 6 can be suppressed.

In addition, in the present embodiment, the thickness of the elastic adhesive member 7 is set to 0.4 mm. According to such a configuration, the thermal stress caused by the difference in the coefficient of thermal expansion, such as the coefficient of linear expansion, between the cover member 6 and the surrounding member 5 is absorbed by the elastic adhesive member 7. Therefore, it is possible to reduce the possibility that the cover member 6 and the surrounding member 5 are cracked due to thermal stress. Furthermore, in the present embodiment, the configuration of the surrounding member 5 and the back case 4, that is, the housing that provides the appearance of the vehicle display device 100 is implemented by using a resin such as a PC. Such a configuration has an advantage that a complicated design can be easily implemented, as compared with a configuration in which a housing is implemented by using a metal material.

<Supplement>

As the resin material described above, in addition to the PC resin, a thermoplastic resin such as polybutylene terephthalate (PBT) or polyphenylene sulfide (PPS) can be used. Further, a synthetic resin obtained by mixing an acrylonitrile butadiene styrene copolymer (ABS) resin with a PC resin can also be adopted. Furthermore, various resins such as polypropylene (PP) can be used. Of the various resin materials, from the viewpoint of impact resistance, heat resistance, and processability, it is preferable to use a PC resin or a synthetic resin obtained by mixing a PC resin with an ABS resin.

Further, as the elastic adhesive described above, one having a predetermined elasticity in a cured state is preferable. As the elastic adhesive materials, there are various types of elastic adhesives, such as those containing silicone rubber as the main component, which are so-called silicone-based adhesives, those containing polyurethane as the main component, those containing rubber as the main component, and those containing acrylic monomer as the main component. The elastic adhesive preferably contains a highly adhesive elastomer as a main component. Silicon-based adhesives also include those containing a modified silicone resin as a main component. The elastic adhesive is preferably a pressure-sensitive adhesive that maintains adhesiveness and elasticity without solidifying in the temperature range, for example, from −40° C. to 110° C., to which the surface of the instrument panel of the vehicle can be subjected.

As the elastic adhesive, various types of elastic adhesives such as a moisture-curable type and an ultraviolet-curable type can be used. The elastic adhesive used in the vehicle display device 100 is preferably a hot melt type adhesive. The hot-melt type elastic adhesive is suitable from the viewpoint of manufacturability (workability) because the coating amount (height, width) can be controlled by using a liquid fixed-quantity discharge device, which is so-called dispenser. In view of the above, in the vehicle display device 100, the elastic adhesive is made by using a one-component type modified silicone resin as a main component. The hot-melt type elastic adhesive is an adhesive that melts at a predetermined temperature (for example, 110° C.) or higher and cures at the temperature or lower, and corresponds to an elastic adhesive having thermoplasticity. As the elastic adhesive, a two-component mixed type adhesive can also be used.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency. Note that members having the same functions as those described in the above embodiment are denoted by the same reference numerals, and a description of the same members will be omitted. When only a part of the configuration is described, the configuration described in the above embodiment can be applied to the other part.

(First Modification)

Figure 8:
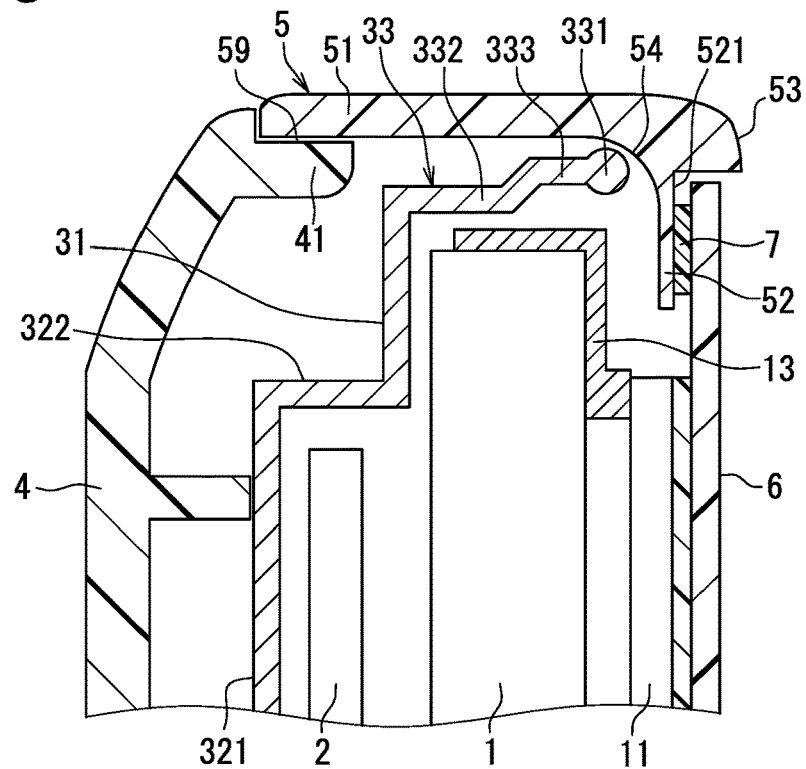
FIG. 8 is an enlarged cross-sectional view of an upper part of a vehicle display device for illustrating a modification of a shape of an end portion of an inner frame.
Figure 9:
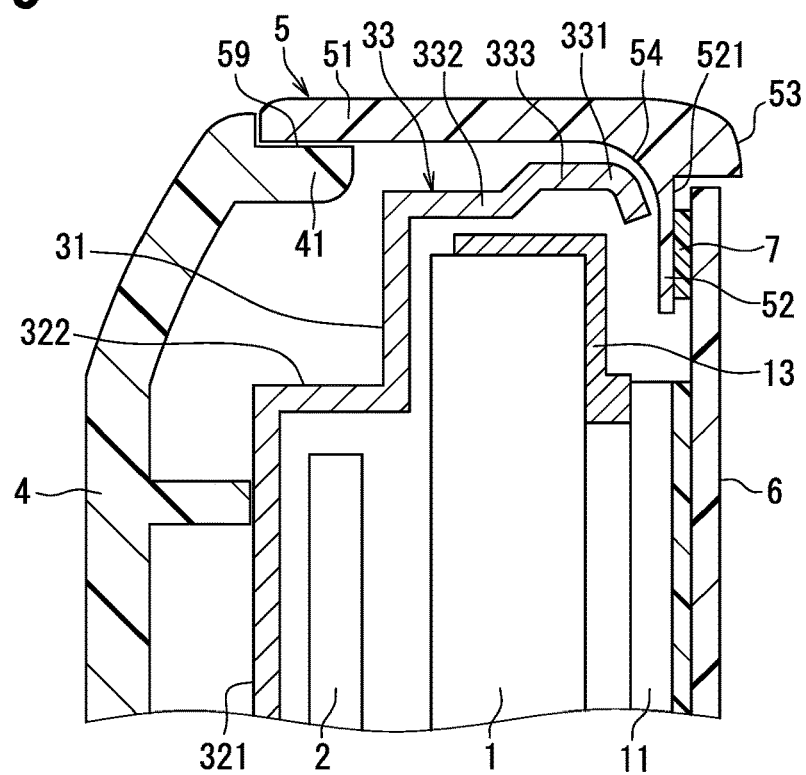
FIG. 9 is an enlarged cross-sectional view of an upper part of a vehicle display device for illustrating a modification of a shape of an end portion of an inner frame.

As shown in FIG. 8, the end portion 331 of the inner frame 33 may be configured to have a circular cross-sectional shape. According to this configuration, the rigidity of the surrounding member 5 against a head collision can be further improved. The end portion 331 of the inner frame 33 may be configured to come into contact with the bezel back side portion 54. Further, as shown in FIG. 9, the inner frame 33 may be formed so that the end portion 331 follows the bezel back side portion 54. In the above configuration, the inner frame 33 acts so as to increase the rigidity of the surrounding member 5. The inner frame end portion 331 is preferably configured to function as a reinforcing portion for increasing the rigidity of the surrounding member 5.

(Second Modification)

Figure 10:
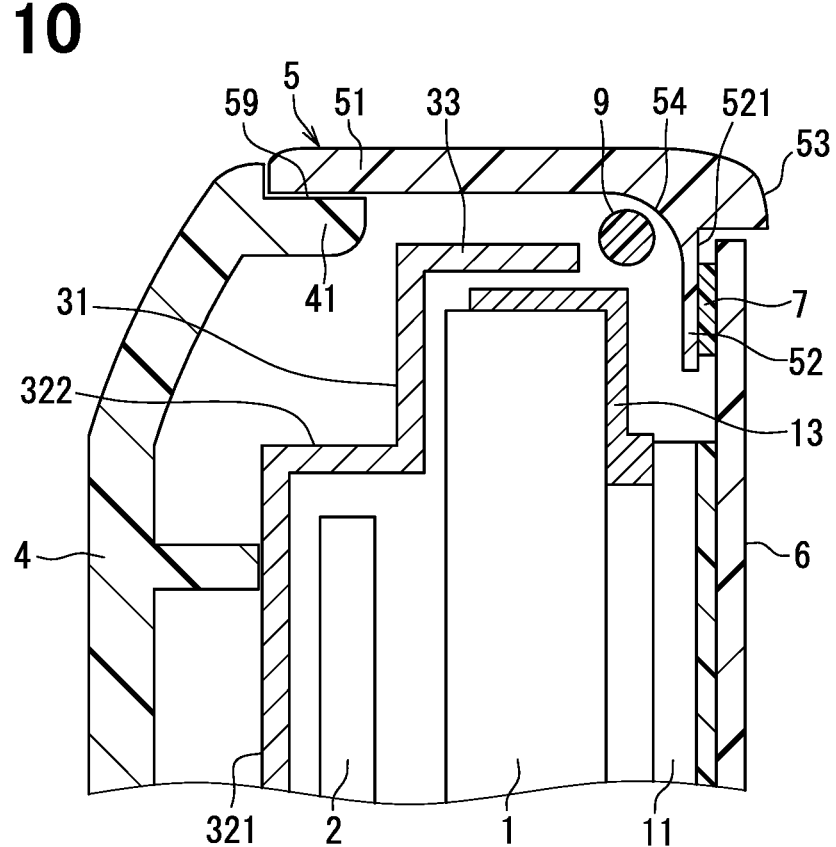
FIG. 10 is an enlarged cross-sectional view of an upper part of a vehicle display device for illustrating an example of a reinforcing member, as a second modification.

As shown in FIG. 10, a reinforcing member 9 for improving the rigidity against a head collision with the upper end portion of the surrounding member 5 may be arranged in the vicinity of the bezel back side portion 54. The reinforcing member 9 is, for example, a columnar or tubular member, and is arranged parallel to the device horizontal direction under the bezel back side portion 54 located above the display unit 1. The reinforcing member 9 may be fixed to, for example, the inner surfaces of left and side wall portions of the surrounding member 5.

Figure 11A:
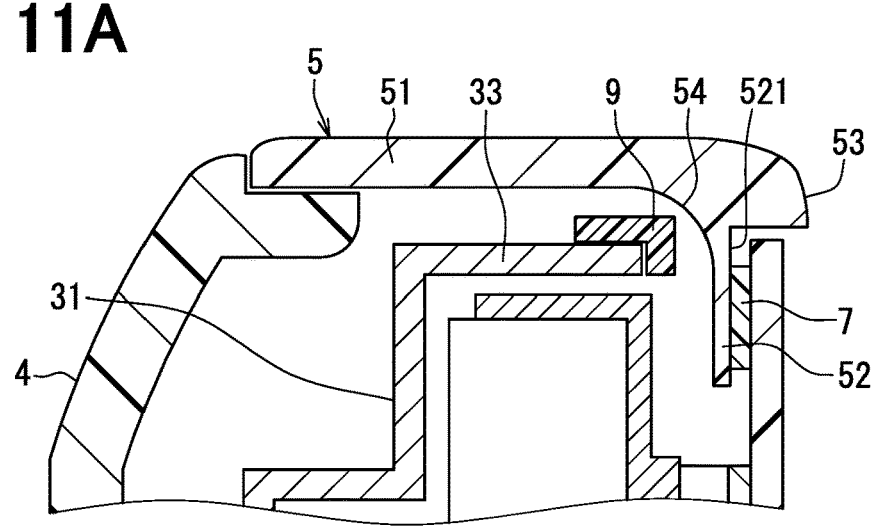
FIG. 11A is an enlarged cross-sectional view of an upper part of a vehicle display device for illustrating an example of a shape of a reinforcing member.
Figure 11B:
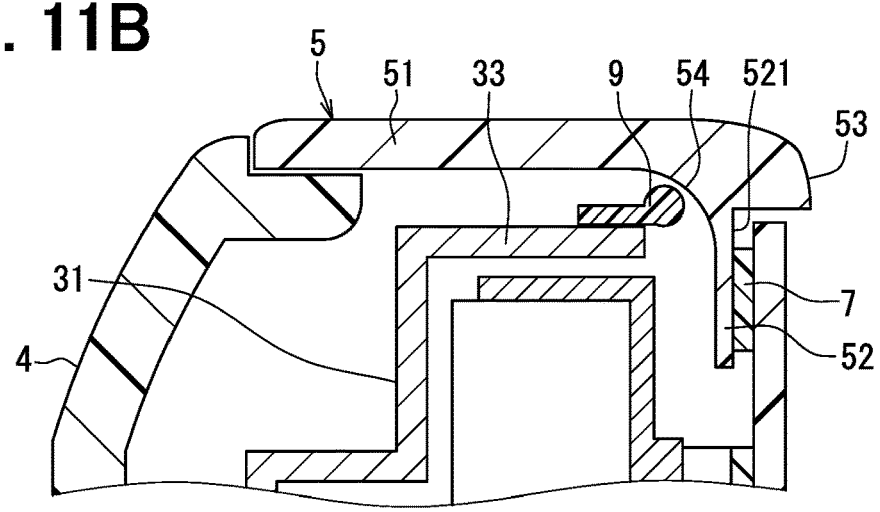
FIG. 11B is an enlarged cross-sectional view of an upper part of a vehicle display device for illustrating another example of a shape of a reinforcing member.
Figure 11C:
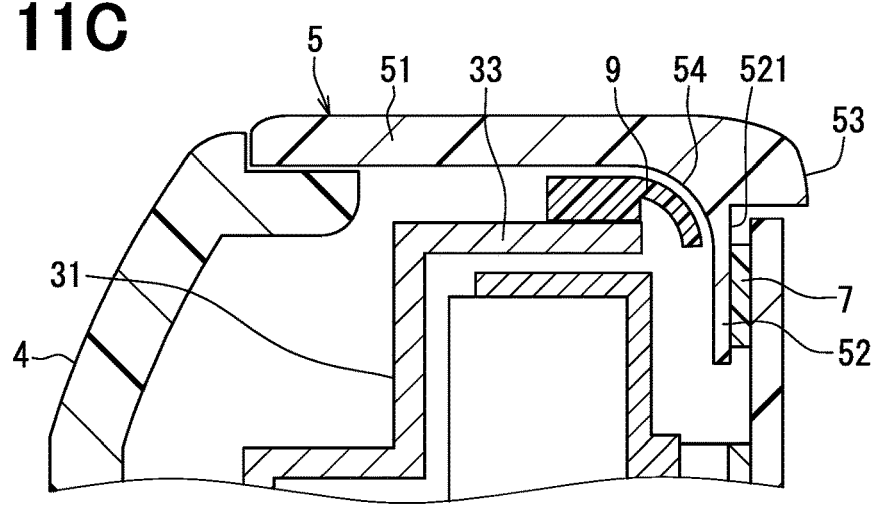
FIG. 11C is an enlarged cross-sectional view of an upper part of a vehicle display device for illustrating further another example of a shape of a reinforcing member.

Further, the reinforcing member 9 may be attached to the inner frame end portion 331, as shown in FIGS. 11A to 11C. The reinforcing member 9 may be configured to increase the rigidity of the surrounding member 5. The reinforcing member 9 may have an L-shaped as shown in FIG. 11A. As another example, the reinforcing member 9 may have a cross-sectional shape with a circular end as shown in FIG. 11B. As further another example, the reinforcing member 9 may be configured to have a portion extending along the bezel back side portion 54, as shown in FIG. 11C. The reinforcing member 9 may be made of a resin, or may be made of a stainless steel or copper material. Further, the shape of the reinforcing member 9 is not limited to a columnar shape or a tubular shape. The reinforcing member 9 may be configured as a leaf spring so that it can easily follow the curved surface shape. The reinforcing member 9 may be combined with the embodiment described above or with the first modification.

(Third Modification)

The vehicle display device 100 may include a touch panel. For example, a touch panel may be arranged between the cover member 6 and the optical adhesive layer 8. Further, the surface of the cover member 6 may be subjected to an anti-reflection (AR) processing, or may have an antireflection film attached thereto. The cover member 6 may be subjected to an anti-glare (AG) processing instead of AR processing. Further, the cover member 6 may be provided with a viewing angle control film that controls the emission direction of the image light. The viewing angle control film is also called a louver array film (LAF). According to the configuration in which the viewing angle control film is provided to the cover member 6, it is possible to suppress the display screen of the display unit 1 from being reflected on the windshield.

(Fourth Modification)

Figure 12A:
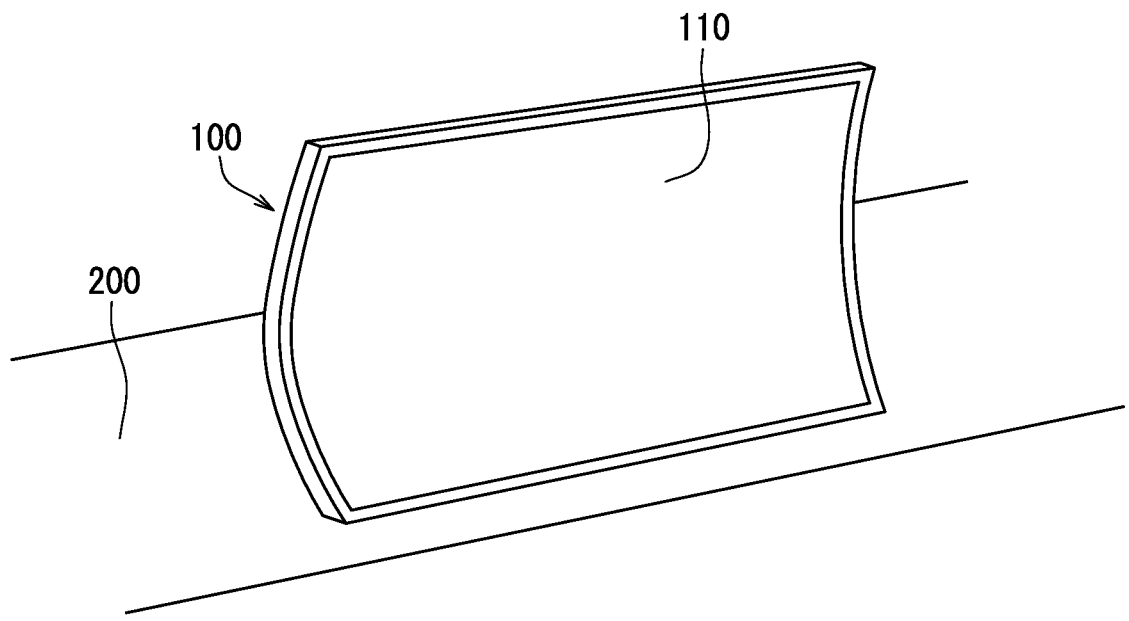
FIG. 12A is a perspective view of a vehicle display device as an example of a fourth modification.
Figure 12B:
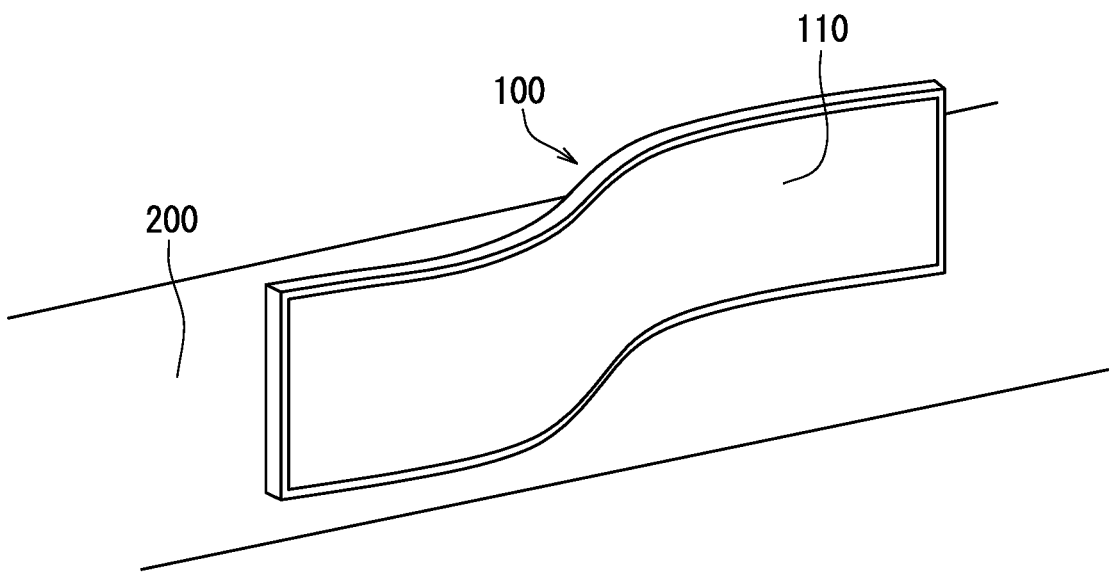
FIG. 12B is a perspective view of a vehicle display device as another example of the fourth modification.

As shown in FIGS. 12A and 12B, the vehicle display device 100 may be configured as a device having a curved display surface, which is so-called a curved display. The curving direction of the display surface is not limited to the directions illustrated in FIGS. 12A and 12B, and may be changed as appropriate. Further, the display surface of the vehicle display device 100 is not limited to a rectangle, and may be an ellipse or the like. The vehicle display device 100 may be used by being attached to a portion other than the instrument panel 200. Further, the vehicle display device 100 may be mounted and used in a position where occupants of the rear seats can see it. For example, the vehicle display device 100 may be used by being attached to the back portion of the backrest of the front seat so that the occupants of the rear seat can see it. The vehicle display device 100 may be attached and used within a certain distance from the seat. As another example, the vehicle display device 100 may be attached and used at a position separated from the seat by a certain distance or more. The vehicle display device 100 may be used outside the head collision area.

What is claimed is:

1. A vehicle display device, comprising:
   a display unit that displays information;
   a surrounding member surrounding a periphery of the display unit and defining an opening at an end on a viewing side; and
   a cover member being disposed on a display surface of the display unit on the viewing side and covering the opening of the surrounding member, the cover member being a transparent plate-shaped member, wherein
   the surrounding member includes:
     a peripheral wall portion having a tubular shape surrounding the periphery of the display unit;
     a cover receiving portion projecting inwardly from an inner surface of the peripheral wall portion, the cover receiving portion supporting an edge of the cover member on a back side of the cover member, the back side being opposite to the viewing side,
   the peripheral wall portion does not cover a surface of the cover member on the viewing side in a direction normal to the surface of the cover member,
   the peripheral wall portion includes an upper surrounding portion located above the display unit,
   the upper surrounding portion has an upper viewing side end that projects from the surface of the cover member in the direction normal to the surface of the cover member by a length of 0.1 mm or more and 2.0 mm or less relative to the surface of the cover member, and
   the cover receiving portion has a back surface opposite to the cover member, and the back surface continuously connects to the inner surface of the peripheral wall portion with a predetermined radius of curvature.

2. The vehicle display device according to claim 1, further comprising:
   an inner case disposed inside of the surrounding member, and supporting a back surface and a side surface of the display unit, wherein
   the inner case includes an inner frame covering the side surface of the display unit, and
   a viewing side end of the inner case is spaced from the side surface of the display unit by 1 mm or more, and is disposed proximate to the back surface of the cover receiving portion.

3. The vehicle display device according to claim 2, wherein
   the viewing side end of the inner frame has a circular shape in cross section.

4. The vehicle display device according to claim 1, further comprising
   a reinforcing member having a predetermined rigidity and being disposed to be in contact with or proximate to a bezel back size portion that is provided by a back portion of the upper viewing side end.

5. The vehicle display device according to claim 1, wherein
   the cover member is adhered to the cover receiving portion of the surrounding member with an elastic adhesive member that has elasticity and adhesiveness.

6. The vehicle display device according to claim 1, wherein
   the upper viewing side end of the surrounding member is spaced from the cover member by a clearance of 0.1 mm or more.

7. The vehicle display device according to claim 1, wherein
   the upper viewing side end of the surrounding member has a thickness of 3.0 mm or less.

8. A vehicle display device, comprising:
   a display unit that displays information;
   a surrounding member surrounding a periphery of the display unit and defining an opening at an end on a viewing side;
   a cover member being disposed on a display surface of the display unit on the viewing side and covering the opening of the surrounding member, the cover member being a transparent plate-shaped member; and
   a reinforcing member disposed inside the surrounding member, wherein
   the surrounding member does not cover a surface of the cover member on the viewing side in a direction normal to the surface of the cover member,
   the surrounding member includes an upper surrounding portion located above the display unit, and
   the upper surrounding portion includes an upper viewing side end that projects from the surface of the cover member in the direction normal to the surface of the cover member by a length of 0.1 mm or more and 2.0 mm or less relative to the surface of the cover member, and
   the reinforcing member has a predetermined rigidity and is disposed to be in contact with or proximate to a bezel back side portion that is provided by a back portion of the upper viewing side end.

9. The vehicle display device according to claim 8, wherein
the cover member is adhered to the surrounding member with an elastic adhesive member that has elasticity and adhesiveness.

10. The vehicle display device according to claim 8, wherein
the upper viewing side end of the surrounding member is spaced from the cover member by a clearance of 0.1 mm or more.

11. The vehicle display device according to claim 8, wherein
the upper viewing side end of the surrounding member has a thickness of 3.0 mm or less.

* * * * *